US011783327B2

(12) United States Patent
Chakraborty et al.

(10) Patent No.: US 11,783,327 B2
(45) Date of Patent: Oct. 10, 2023

(54) SYSTEM AND METHOD FOR DETECTING SIGNATURE FORGERIES

(71) Applicant: Walmart Apollo, LLC, Bentonville, AR (US)

(72) Inventors: Souradip Chakraborty, Bangalore (IN); Ojaswini Chhabra, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/101,760

(22) Filed: Jan. 26, 2023

(65) Prior Publication Data

US 2023/0177499 A1     Jun. 8, 2023

Related U.S. Application Data

(63) Continuation of application No. 17/860,208, filed on Jul. 8, 2022, now abandoned, which is a continuation
(Continued)

(30) Foreign Application Priority Data

Nov. 24, 2018 (IN) .............................. 201841044303
Feb. 27, 2019 (IN) .............................. 201941007555

(51) Int. Cl.
    *G06Q 20/38*     (2012.01)
    *H04L 9/32*     (2006.01)
    (Continued)

(52) U.S. Cl.
CPC ... *G06Q 20/3825* (2013.01); *G06F 18/24155* (2023.01); *G06N 3/08* (2013.01);
(Continued)

(58) Field of Classification Search
CPC .......... G06Q 20/3825; G06Q 20/4014; G06Q 20/4016; G06K 9/6278; G06K 9/00161;
(Continued)

(56) References Cited

U.S. PATENT DOCUMENTS 4,985,928 A     1/1991    Campbell
5,745,592 A     4/1998    Nalwa
(Continued)

FOREIGN PATENT DOCUMENTS

KR      20180061489 A     6/2018
WO         0042563 A2     7/2000

OTHER PUBLICATIONS

Bouamra, Walid, Chawki Djeddi, Brahim Nini, Moises Diaz, and Imran Siddiqi. Towards the design of an offline signature verifier based on a small number of genuine samples for training. Expert Systems with Applications 107 (2018): 182-195. (Year: 2018).
(Continued)

*Primary Examiner* — Carol Wang
(74) *Attorney, Agent, or Firm* — Fitch, Even, Tabin & Flannery LLP

(57) ABSTRACT

Two models are first trained and then test images are applied to the two trained models in an effort to detect signature forgeries. The first model is trained with pairs of signature images and the resultant trained model is capable of detecting blind forgeries. The second model is trained with triplets of signature images and is capable of detecting skilled signature forgeries. After the two models are trained, test images are applied to the models and determinations are made as to whether a blind or skilled forgery is present.

18 Claims, 9 Drawing Sheets

Related U.S. Application Data of application No. 16/689,301, filed on Nov. 20, 2019, now abandoned.

(60) Provisional application No. 62/839,953, filed on Apr. 29, 2019.

(51) Int. Cl.
*G06N 3/08* (2023.01)
*G06V 40/30* (2022.01)
*G06F 18/2415* (2023.01)
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/764* (2022.01); *G06V 10/774* (2022.01); *G06V 10/776* (2022.01); *G06V 10/82* (2022.01); *G06V 40/33* (2022.01); *H04L 9/3257* (2013.01)

(58) Field of Classification Search
CPC .. G06K 9/6272; G06K 9/6256; G06K 9/6262; G06N 3/08; G06N 3/0454; G06N 7/005; G06V 40/33; G06V 10/82; G06V 10/764; G06V 10/774; G06V 10/776; H04L 9/3257; G06F 18/24155
See application file for complete search history.

(56) References Cited

U.S. PATENT DOCUMENTS

| | | |
|---|---|---|
| 7,454,042 B2 | 11/2008 | Lee |
| 7,542,593 B1 | 6/2009 | Chaurasia |
| 8,452,098 B2 | 5/2013 | Nepomniachtchi |
| 8,612,763 B1 | 12/2013 | Axel |
| 10,825,028 B1 | 11/2020 | Kramme |
| 2007/0154071 A1 | 7/2007 | Lin |
| 2020/0167772 A1 | 5/2020 | Chakraborty |
| 2022/0351199 A1 | 11/2022 | Chakraborty |

OTHER PUBLICATIONS

Hanmandlu, Madasu, Mohd Hafizuddin Mohd Yusof, and Vamsi Krishna Madasu. "Off-line signature verification and forgery detection using fuzzy modeling." Pattern Recognition 38, No. 3 (2005): 341-356. (Year: 2005).

Kennard, Douglas J., William A. Barrett, and Thomas W. Sederberg. "Offline signature verification and forgery detection using a 2-D geometric warping approach." In Proceedings of the 21st International Conference on Pattern Recognition (ICPR2012), pp. 3733-3736. IEEE, 2012. (Year: 2012).

Khalid, Marzuki, Rubiyah Yusof, and Hamam Mokayed. "Fusion of multi classifiers for online signature verification using fuzzy logic inference." International Journal of Innovative Computing 7, No. 5 (2011): 2709-2726. (Year: 2011).

Oladele, T. O. et al.; "Forged Signature Detection Using Artificial Neural Network"; African Journal of Computing & ICT; vol. 7, No. 3; Sep. 2014; pp. 11-20.

P, Babita; "Online Signature Recognition Using Neural Network"; Journal of Electrical & Electronic Systems; vol. 4, Issue 3; Sep. 15, 2015; pp. 1-5.

Sthapak et al.; "Artificial Neural Network Based Signature Recognition & Verification"; International Journal of Emerging Technology and Advanced Engineering; vol. 3, Issue 8; Aug. 2013; pp. 191-197.

USPTO; U.S. Appl. No. 16/689,301; Notice of Allowance and Fees Due (PTOL-85) dated Apr. 12, 2022; (pp. 1-14).

USPTO; U.S. Appl. No. 17/860,208; Notice of Allowance and Fees Due (PTOL-85) dated Nov. 4, 2022; (pp. 1-12).

SYSTEM AND METHOD FOR DETECTING SIGNATURE FORGERIES

CROSS REFERENCES TO RELATED APPLICATIONS

This application is a continuation application of U.S. application Ser. No. 17/860,208 filed Jul. 8, 2022, which is a continuation application of U.S. application Ser. No. 16/689,301 filed Nov. 20, 2019, which claims the benefit of U.S. Provisional Application No. 62/839,953 filed Apr. 29, 2019, and additionally claims the benefit of Indian Provisional Application No. 201841044303 filed Nov. 24, 2018 and Indian Provisional Application No. 201941007555 filed Feb. 27, 2019, all of which are incorporated herein by reference in their entireties.

TECHNICAL FIELD

These teachings generally relate to detecting signature forgeries and, more specifically, to taking actions once a forgery has been detected.

BACKGROUND

Retail and business environments require signatures on different forms of documents to complete various types of transactions. For example, an electronic credit card acceptance apparatus may have a screen where a customer enters their signature to complete a transaction. In another example, a paper check may be signed and presented to a cashier to complete a retail transaction. In still other examples, contracts with suppliers are signed allowing the supplier to provide merchandise for stores.

An authentic signature is required to complete these and other types of transactions. Sometimes, however, signatures are forged for nefarious purposes.

Generally, signature fraud or forgery can be broadly of two types: blind forgeries and skilled forgeries. Blind forgeries are where the forger has no idea what the signature to be forged looks like. Skilled forgeries can be created by simulation or tracing (in two examples), in which the forger has a sample of the signature to be forged. In the case of skilled forgeries, detecting fraud requires more sophisticated tools to differentiate minute but critical details between genuine and forged signatures.

BRIEF DESCRIPTION OF THE DRAWINGS

The above needs are at least partially met through the provision of approaches that detect signature forgeries, wherein.

DETAILED DESCRIPTION

Figure 1A:
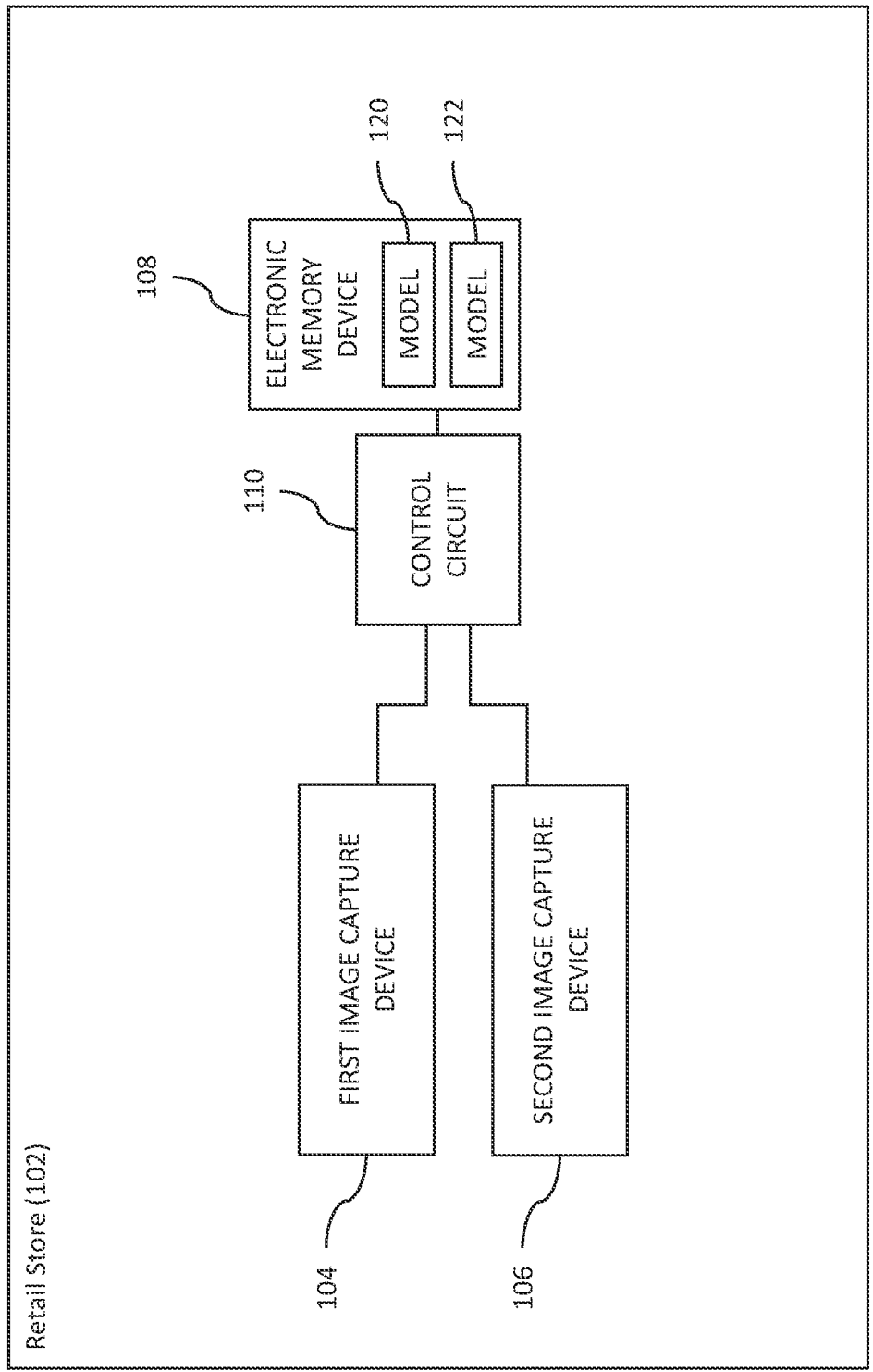
FIG. 1A comprises a diagram of a system as configured in accordance with various embodiments of these teachings.

Generally speaking, these approaches first train two models and then apply test images to the models in an effort to detect signature forgeries. More specifically, a first model is trained with pairs of signature images and the resultant trained model is capable of detecting blind forgeries. A second model is trained with triplets of signature images and the resultant trained model is capable of detecting skilled signature forgeries. After the two models are trained, test images are applied to the models and determinations are made as to whether a blind forgery, skilled forgery, or genuine signature is present.

In some aspects, the present approaches provide a hierarchical framework to detect fraudulent signatures using image processing and deep convolutional Siamese networks where forgeries of a first type (e.g., a blind forgery) are first detected. Then, forgeries of a second type (e.g., skilled forgeries) are detected.

In the first stage of the hierarchical framework, a pairwise training that computes a dissimilarity score between each pair of image embeddings of signatures (whether they are intended for the same person or otherwise) is performed. Each pair will have a dissimilarity score, and a label whether they are a genuine or blind forgery. In examples, this is modeled using Siamese convolutional twin networks coupled with generalized linear model architecture with logistic loss functions. During testing, the images of signatures that are blind forgeries are detected by this model and filtered out, and the signatures not determined to be blind forgeries are sent to the next step where a test for skilled forgeries is made.

In the second stage, skilled forgeries where the signature looks very similar to the original are detected. Here, in some aspects, a deep triplet ranking network using Siamese convolution network and triplet loss is used as the objective function using Bayesian optimization for the model hyperparameters. This network has been previously trained to detect such forgeries. According to some aspects of this framework, once the models are trained, only one base image is required to determine whether another signature image is genuine or not with one shot learning.

In some of these embodiments, a system for detecting forged information in a retail environment includes a retail store, a first image capture device, a second image capture device, an electronic memory device, and a control circuit.

The first image capture device is configured to obtain first images of signatures. The second image capture device that is deployed in the retail store. The electronic memory device stores a first mathematical model and a second mathematical model.

The control circuit is configured to train the first mathematical model with pairs of the first images obtained from the first image capture device. The training is effective to allow the first model to detect blind signature forgeries and to produce a trained first mathematical model. The training of the first mathematical model results in a physical transformation of the first mathematical model.

The control circuit is further configured to train the second mathematical model with triplets of the first images obtained from the first image capture device. The training is effective to allow the second mathematical model to detect skilled signature forgeries and to produce a trained second mathematical model. The training results in a physical transformation of the second mathematical model.

Subsequently, a test image is received from the second image capture device. The test image includes a second signature that is associated with a transaction concerning the retail store or a product in the retail store. The control circuit is configured to apply the test image to the trained first mathematical model, and when the application determines the second signature in the test image is a blind signature forgery, perform a first action.

The control circuit is configured to, when the application does not detect a blind forgery, apply the test image to the trained second mathematical model to determine whether the second signature in the test image is a skilled forgery. The control circuit is still further configured to, when the second signature in the test image is determined to be a skilled forgery, perform a second action. The control circuit is additionally configured to, when the second signature in the test image is determined not to be a skilled forgery, perform a third action.

The first action, the second action, and the third action include one or more of: halting a retail transaction, finalizing or validating a retail transaction, issuing an electronic alert to an employee of the retail store, issuing an electronic inquiry, accepting merchandise from a supplier at a loading dock of the retail store, or releasing merchandise to a customer using an automated vehicle or robot. Other examples are possible.

In aspects, the training of the first mathematical model includes determining a dissimilarity score as between the pairs of the first images. In other aspects, a Bayesian optimization is utilized to optimize parameters of the first mathematical model and the second mathematical model.

In other examples, each triplet of the second images comprises an anchor image, a positive sample image, and a negative sample image. Other examples are possible.

In some other aspects, the first model and the second model are convolutional neural networks. Other examples are possible.

In other examples, the control circuit comprises a first control circuit and a second control circuit. The first control circuit is disposed at a central location remote from the retail store. The second control circuit is associated with a mobile electronic device running software application and is disposed at the retail store.

In still other aspects, the signatures are associated with retail customers or business suppliers. In other examples, the signatures are disposed on paper documents or are electronic signatures.

In others of these embodiments, an approach for detecting forged information in a retail environment includes configuring a first image capture device to obtain first images of signatures. A second image capture device is deployed in a retail store. A first mathematical model and a second mathematical model are stored in an electronic memory device.

A control circuit trains the first mathematical model with pairs of the first images obtained from the first image capture device. The training is effective to allow the first model to detect blind signature forgeries and to produce a trained first mathematical model. The training of the first mathematical model results in a physical transformation of the first mathematical model.

The control circuit trains the second mathematical model with triplets of the first images obtained from the first image capture device. The training is effective to allow the second mathematical model to detect skilled signature forgeries and to produce a trained second mathematical model. The training results in a physical transformation of the second mathematical model.

Subsequently, the control circuit receives a test image from the second image capture device. The test image includes a second signature that is associated with a transaction concerning the retail store or a product in the retail store. The control circuit applies the test image to the trained first mathematical model, and when the application determines the second signature in the test image is a blind signature forgery, performs a first action.

When the application does not detect a blind forgery, the control circuit applies the test image to the trained second mathematical model to determine whether the second signature in the test image is a skilled forgery. When the second signature in the test image is determined to be a skilled forgery, the control circuit performs a second action. When the second signature in the test image is determined not to be a skilled forgery, the control circuit performs a third action.

The first action, the second action, and the third action include one or more of: halting a retail transaction, finalizing or validating a retail transaction, issuing an electronic alert to an employee of the retail store, issuing an electronic inquiry, accepting merchandise from a supplier at a loading dock of the retail store, or releasing merchandise to a customer using an automated vehicle or robot. Other examples are possible.

Advantageously, the convolutional neural network (CNN) architecture used for the triplet loss model provides a balance between accuracy attained and the computation requirements. The final encodings from this model are the intermediate layer model (e.g. the GlobalMaxPooling layers of CNN models described elsewhere herein).

In some aspects, the model hyperparameters (e.g., alpha, batch size, epochs) can be optimized using Bayesian optimization which can save a significant amount concerning the time complexity of the grid search with selecting the best hyperparameter at each iteration. In some implementations, one aspect is to correctly estimate the value of the threshold alpha as used in the triplet loss function using Bayesian theory.

In some examples, once the final image embeddings through the triplet loss architecture are obtained, a generalized linear model with logistic loss function is trained to obtain the final model that declares any signature as genuine or forged against a base image signature. In some cases, for training this logistic function, the images are arranged in a pairwise manner where each observation is pair of images, either both of a person's genuine signature, or one of person's genuine signature, and the other as person's skilled forged signature. These will have labels (or class) "genuine" or "fraud" assigned to them, respectively.

Since in the data, and in some aspects, there are many more genuine-fraud image combinations than genuine-genuine image combinations, there is potentially a major class imbalance problem. In aspects, this problem is addressed because otherwise the model will be skewed to return fraud as the resultant class. In some examples, this is accomplished by under-sampling the fraud class, i.e., only a random subset of the genuine-fraud image combinations is obtained to make the classes in the data more balanced. Other examples are possible.

In some other aspects, the Logistic model is trained on the subset of dataset pairs to determine that given a base signature image, whether the other image matches the base (genuine) or not (forged). In some examples, cross validation is used to obtain the final logistic model taking the corresponding differences between the embeddings of each of the pairs (e.g., 128 length difference vector of embeddings) as the feature set and the class labels (e.g., genuine/fraud) as the dependent variable y.

In some examples, these steps end the one-time training process for signature verification. The model objects from the two trained CNN models are saved along with the Logistic model as the final model for the real time verification (the testing) process. As described herein, the Logistics model uses logistic regression approaches and belongs to the category of linear models with log-likelihood loss functions, while the CNN models are convolutional neural networks belonging to the class of artificial neural network-based models.

In some aspects, once the above training process is completed, the final trained model outputs are obtained and used. A database framework is created to save the original signatures of every new individual (with a signature that may need to be tested) against or linked to a unique identifier (ID). The base images are passed through the models obtained in the training process and the corresponding embeddings from a CNN Model 1 and a CNN Model 2 are obtained. In some examples, the embeddings are in the format of a vectors and are of length 128. These embeddings are pre-computed and saved against (linked to) the individuals' unique ID in the database. Now, whenever a new signature image is obtained that needs to be accessed to determine whether it is genuine or fraud, a control circuit first passes that image through the trained CNN Model 1 along with the corresponding embeddings obtained from this model of the base image. The model output is a class prediction of whether the new image is genuine or forged. In some examples, if the prediction class in this step it is determined to be forged, then the control circuit stops there and declares the image to be a fraudulent signature. Conversely, in some aspects, if the signature is found to be genuine, then the control circuit goes to the next step of getting the embeddings from the CNN Model 2 and compares it to the corresponding base image encoding of CNN Model 2. In some examples, this is done by taking the difference vector between these two embeddings and passing it through the pre-trained Logistic model 2. In some aspects, if the prediction class here is found to be genuine, then the machine declares the new image as a genuine, otherwise it is considered a forgery.

In some cases, the differences between the images of a genuine signature and its skilled forgery are at times very minute and is challenging to detect by even a trained eye. In some examples, deep Triplet Ranking CNN uses a very powerful loss function used in the industry for face recognition (e.g., facenet).

In some embodiments, the custom CNN model is created based on this loss function wherein the image embeddings are created in such a way that the dissimilarity between the anchor image and positive image must be low and the dissimilarity between the anchor image and the negative image must be high for every triplet. This kind of architecture ensures that even small differences between signatures can be captured in order to flag a skilled forgery effectively.

As mentioned, the approaches described herein use a training process for mathematical models. In aspects, the training process consists of obtained the trained model objects of a CNN Model 1, a CNN Model 2, and a Logistic Model 2. In some embodiments, this process requires an image database of signatures to train (learn) from and validate the accuracy results. This training process can be hosted in Python (or other similar programming languages like R/Java/C++ etc.) and requires significant compute resources (like CPU/GPU) to train and get to the final models.

In some embodiments, the test process consists of maintaining a database with one base signature embeddings saved against a unique ID and testing every subsequent signature image with the same ID against that. In aspects, this is a one-shot learning process where only a single image is required for one ID to test any other image against it. This process can be hosted on computers, mobile phones, or any other remote piece of software which can consume signature images to be tested. Saving the image embeddings of base signature and the logistic model weights does not require much memory and the detection process only requires minute computation power of calculating the difference and predicting the logistic class. In some embodiments, this process is instantaneous and requires very little memory and can use available computing ability of a processing device.

Embodiments of the algorithm framework described herein can be used in multiple commercial, business, and other settings in a variety of different ways. One such example is testing customer or employee signatures on documents against their base signatures saved beforehand. This process can be seamlessly carried out on computers, control circuits, and other processing devices by scanning the new signature image, providing the image path and providing the ID against which to test the signature. The pre-trained weights and embeddings will be saved on the computer itself or on a cloud location and the testing process can be carried out either locally on the computer in an installed application or through the application hosted on cloud, a website, or other locations.

Referring now to FIG. 1, a system 100 includes a retail store 102, a first image capture device 104, a second image capture device 106, an electronic memory device 108, and a control circuit 110.

The retail store 102 is any type of retail store selling any types of products or combinations of products. In other examples, the retail store 102 may instead be a warehouse (or include a storage area) or a distribution center. The retail store 102 includes a dock where products are unloaded from trucks or other vehicles. Various automated vehicles (or humans) move the products from the trucks to inside the store 102 (e.g., to a storage area or backroom in the store, or directly to a display area). The store 102 also includes shelves or other display units where the products are presented for sale to customers.

The first image capture device 104 is any type of device that is configured to obtain images of signatures. In these regards, the first image capture device 104 may be a camera that obtains signature images from paper documents. In other examples, the first image capture device 104 may obtain electronic signatures that have been captured from electronic devices where a person signs electronically (e.g., using an electronic pen to sign on an electronic screen). Other examples are possible. The first image capture device 104 may be deployed at the retail store 102 or at a central location not in the store 102. In aspects, the signatures are associated with retail customers or business suppliers. As mentioned, the signatures are disposed on paper documents or are electronic signatures. Other examples are possible. The first image capture device 104 is coupled to the control circuit 110 either directly or through an electronic communication network.

The second image capture device 106 is any type of device that captures or obtains images of signatures. The second image capture device 106 is deployed in the retail store 102. In these regards, the second image capture device 106 may be a camera that obtains signature images from paper documents. In other examples, the second image capture device 106 may obtain electronic signatures that have been captured from electronic devices where a person signs electronically (e.g., using an electronic pen to sign on an electronic screen). Other examples are possible. The second image capture device 106 is coupled to the control circuit 110 either directly or through a network. The second image capture device 106 may be disposed at various locations within the store such as a check-out area or in an office.

The electronic memory device 108 stores a first mathematical model 120 (sometimes referred to as CNN Model 1 herein) and a second mathematical model 122 (sometimes referred to herein as the combination of CNN Model 2 and Logistic regression Model 2 (or Logistic Model 2)). The electronic memory device 108 may be any type of electronic memory device (permanent or temporary) that stores information in electronic form.

As mentioned, the first mathematical model 120 and the second mathematical mode 122 may be or include convolutional neural network (CNN) models as known in the art and these include multiple layers and neurons. However, any other type of model may also be used such as models that use or include equations. Other examples are possible. The second mathematical model also includes, in some examples, a Logistic regression model.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

The control circuit 110 is configured to train the first mathematical model 120 with pairs of the first images obtained from the first image capture device 104. The training is effective to allow the first model 120 to detect blind signature forgeries and to produce a trained first mathematical model 120. The training of the first mathematical model 120 results in a physical transformation of the first mathematical model 120. For example, layers, neurons, or other elements of the model 120 are changed.

The control circuit 110 is further configured to train the second mathematical model 122 with triplets of the first images obtained from the first image capture device 104. In some aspects, each triplet of the second images comprises an anchor image, a positive sample image, and a negative sample image.

The training is effective to allow the second mathematical model 122 to detect skilled signature forgeries and to produce a trained second mathematical model 122. The training results in a physical transformation of the second mathematical model 122. For example, layers, neurons, or other elements of the model 122 are changed.

Subsequently, a test image is received from the second image capture device 106 in real-time. The test image includes a second signature that is associated with a transaction concerning the retail store 102 or a product in the retail store 102. The control circuit 110 is configured to apply the test image to the trained first mathematical model 120, and when the application determines the second signature in the test image is a blind signature forgery, perform a first action.

The control circuit 110 is configured to, when the application does not detect a blind forgery, apply the test image to the trained second mathematical model 122 to determine whether the second signature in the test image is a skilled forgery. The control circuit 110 is still further configured to, when the second signature in the test image is determined to be a skilled forgery, perform a second action. The control circuit 110 is additionally configured to, when the second signature in the test image is determined not to be a skilled forgery, perform a third action.

The first action, the second action, and the third action include one or more of: halting a retail transaction, finalizing or validating a retail transaction, issuing an electronic alert to an employee of the retail store, issuing an electronic inquiry, accepting merchandise from a supplier at a loading dock of the retail store, or releasing merchandise to a customer using an automated vehicle or robot. Other examples of actions are possible.

Halting a retail transaction may include issuing an alert to a store employee, flashing a visual indicator that a transaction is halted, alerting security personal, or halting the electronic transaction at a cash register. Finalizing or validating a retail transaction may include physically printing a sales receipt, or have an automated vehicle physically fetch merchandise for a customer. Issuing an electronic alert to an employee of the retail store may include presenting a message to an employee at the point-of-sales area or on a mobile device. Issuing an electronic inquiry may be done in any electronic form such as email or text. Accepting merchandise from a supplier at a loading dock of the retail store may include opening a door at the dock area, unlocking a door at the dock area, sending messages for personnel to report to the loading dock, directing or controlling automated vehicles or robots to remove merchandise from a delivery truck and/or move the merchandise into the store. Releasing merchandise to a customer using an automated vehicle or robot may include instructing or controlling the automated vehicle or robot to navigate through the store to find the merchandise, retrieve the merchandise, temporarily store or secure the merchandise to the vehicle, physically navigate the vehicle back through the store, and physically release (present) the merchandise to the customer. It will be appreciated that these actions are physical interactions between physical elements and result in a change in physical movement, change in location, or control of various ones of the physical elements.

In aspects, the training of the first mathematical model includes determining a dissimilarity score as between the pairs of the first images. In other aspects, a Bayesian optimization is utilized to optimize parameters of the first mathematical model and the second mathematical model. Other examples are possible.

Figure 1B:
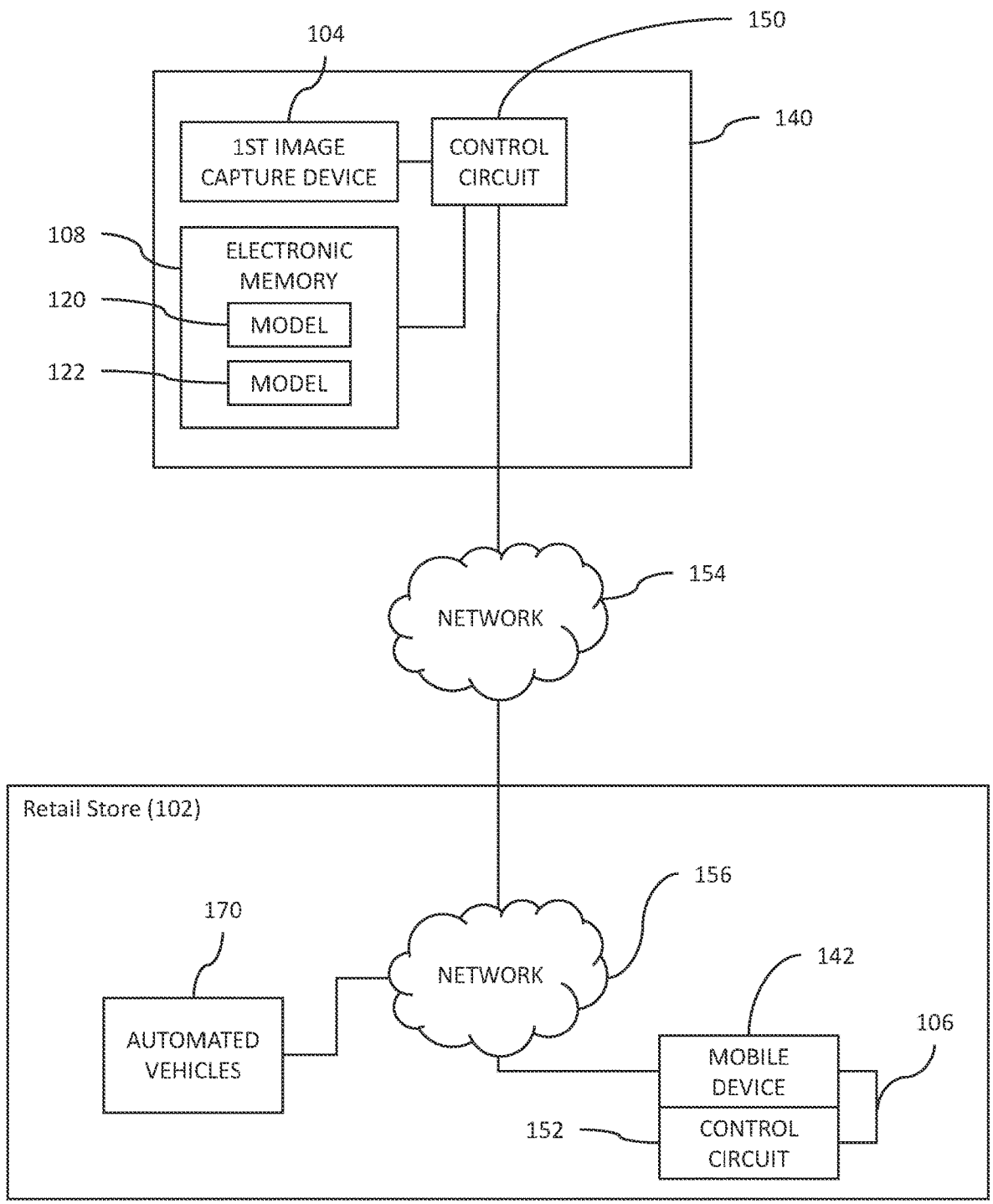
FIG. 1B comprises a diagram of a system as configured in accordance with various embodiments of these teachings.

In the example of FIG. 1A, the control circuit 110 is disposed in the retail store 102. However, in the example of FIG. 1B, the control circuit 110 comprises a first control circuit 150 and a second control circuit 152, which are now two physically separate devices.

In some aspects, the first control circuit 150 is disposed at a central location 140 that is physically separate from and remote from the retail store 102. In aspects, the central location 140 may be a company headquarters that is physically distant from the store 102. The second control circuit 152 is incorporated with or into a mobile electronic device 142 running software application and, in aspects, is disposed at the retail store 102. The mobile electronic device 142 may be operated at the store 102, for example, by an employee.

A first network 154 couples to the first control circuit 150 and to a second network 156. The networks 154 and 156 are any type of electronic communication network. In some example, the networks 154 and 156 may be combined into a single network.

The first control circuit 150 couples to the first image capture device 104 (now disposed at the central location 140) and the electronic memory device 108 (also now disposed at the central location 140). The second image capture device 106 (e.g., a camera) is now incorporated into the mobile electronic device 142. The models 120 and 122 in the electronic memory device 108, once trained, may be downloaded for use to the second control circuit 152.

In this way, the model training, as described elsewhere herein, is performed at the central location 140 advantageously allowing large volumes of images to be processed from multiple locations (e.g., instead of at a single store). The second control circuit 152 executes a mobile software application, obtain test images (e.g., from a camera on the mobile device 142), determine whether signatures in the images are blind forgeries, skilled forgeries, or authentic, and then instigate one or more action based upon this determination all as described elsewhere herein. In one specific example, the actions are sent via control signals to an automated vehicle 170 (e.g., a drone or automated ground vehicle) and cause the vehicle 170 to perform various actions (e.g., move products). The remote disposition of the second control circuit 152 (e.g., at a user mobile device 142) allows a determination as to the authenticity of test images to be quickly and efficiently made. Thus, this particular architecture advantageously allows both training and testing speeds and efficiencies to be maximized.

Figure 2:
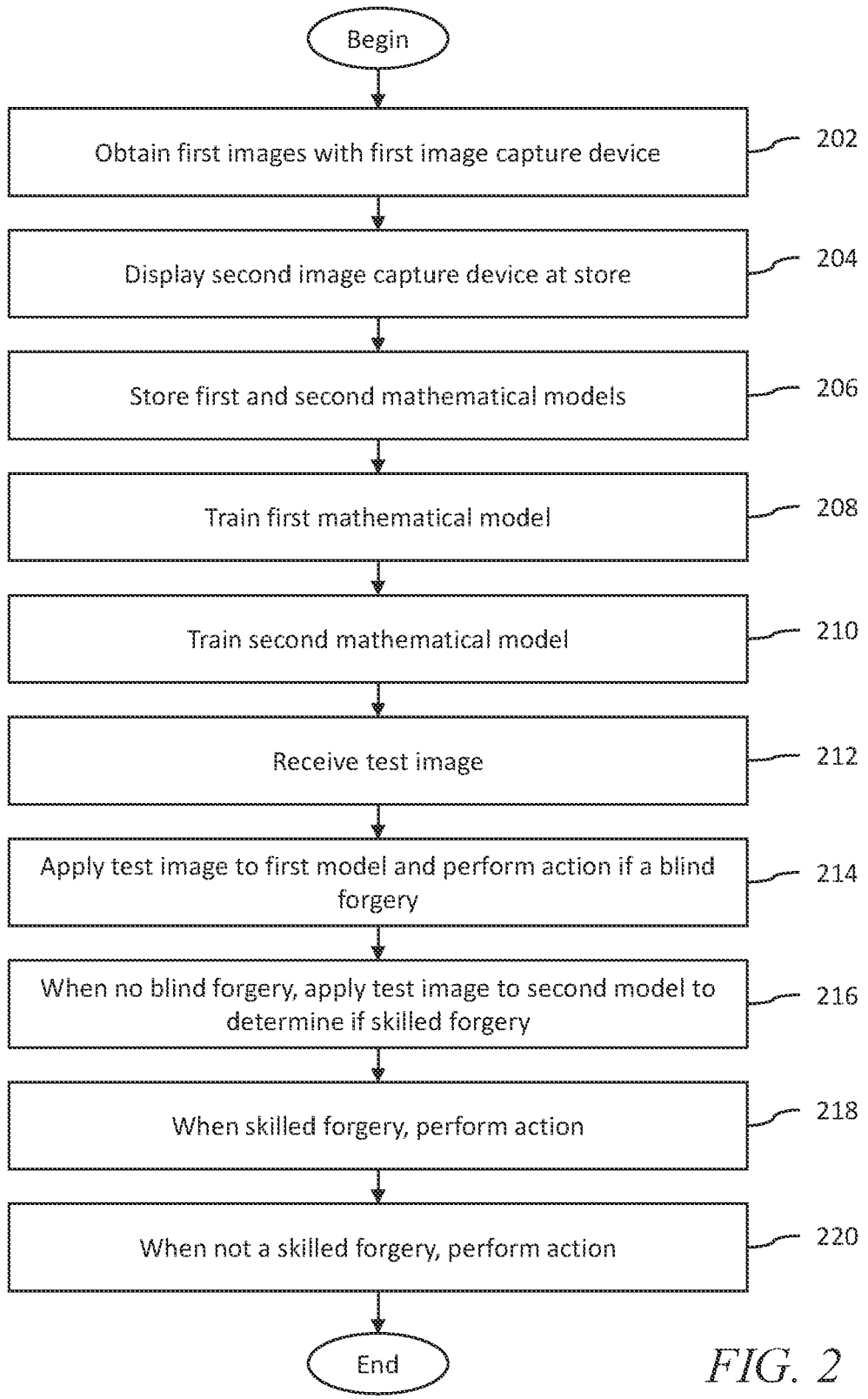
FIG. 2 comprises a flowchart as configured in accordance with various embodiments of these teachings.

Referring now to FIG. 2, one example of an approach for detecting forged signature in images is described. At step 202, a first image capture device is configured to obtain first images of signatures. The first image capture device may be a camera and may be deployed at a central location (within or remote from a retail store) where technicians, employees, or others scan in signatures. The signatures may be marked as genuine or counterfeit (e.g., by an employee or some automatic process).

At step 204, a second image capture device is deployed in a retail store. For example, the second image capture device may be deployed at a checkout area or in the office of the store. Other examples of locations are possible. At step 206, a first mathematical model and a second mathematical model are stored in an electronic memory device. The models may be convolutional neural network (CNN) models in one example. In aspects, the second mathematical model also includes a Logistics model.

At step 208, a control circuit trains the first mathematical model with pairs of the first images obtained from the first image capture device. The training is effective to allow the first model to detect blind signature forgeries and produces a trained first mathematical model. The training of the first mathematical model results in a physical transformation of the first mathematical model. For example, layers or neurons (e.g., their number, properties, or arrangement) of the model may be changed.

At step 210, the control circuit trains the second mathematical model with triplets of the first images obtained from the first image capture device. The training is effective to allow the second mathematical model to detect skilled signature forgeries and produces a trained second mathematical model. The training results in a physical transformation of the second mathematical model.

Subsequently, at step 212, the control circuit receives a test image from the second image capture device. The test image includes a second signature that is associated with a transaction concerning the retail store or a product in the retail store.

At step 214, the control circuit applies the test image to the trained first mathematical model, and when the application determines the second signature in the test image is a blind signature forgery, performs a first action.

At step 216 and when the application does not detect a blind forgery, the control circuit applies the test image to the trained second mathematical model to determine whether the second signature in the test image is a skilled forgery.

At step 218 and when the second signature in the test image is determined to be a skilled forgery, the control circuit performs a second action.

At step 220 and when the second signature in the test image is determined not to be a skilled forgery, the control circuit performs a third action. The first action, the second action, and the third action include one or more of: halting a retail transaction, finalizing or validating a retail transaction, issuing an electronic alert to an employee of the retail store, issuing an electronic inquiry, accepting merchandise from a supplier at a loading dock of the retail store, or releasing merchandise to a customer using an automated vehicle or robot. Other examples are possible. In examples, these actions are instigated or controlled by the determination as to whether a test signature is a forgery or genuine. In aspects, the actions involve physical movement of automated vehicles through stores, the movement of merchandise into store and/or within a store by the automated vehicles, by humans, or by other mechanical devices.

Figure 3:
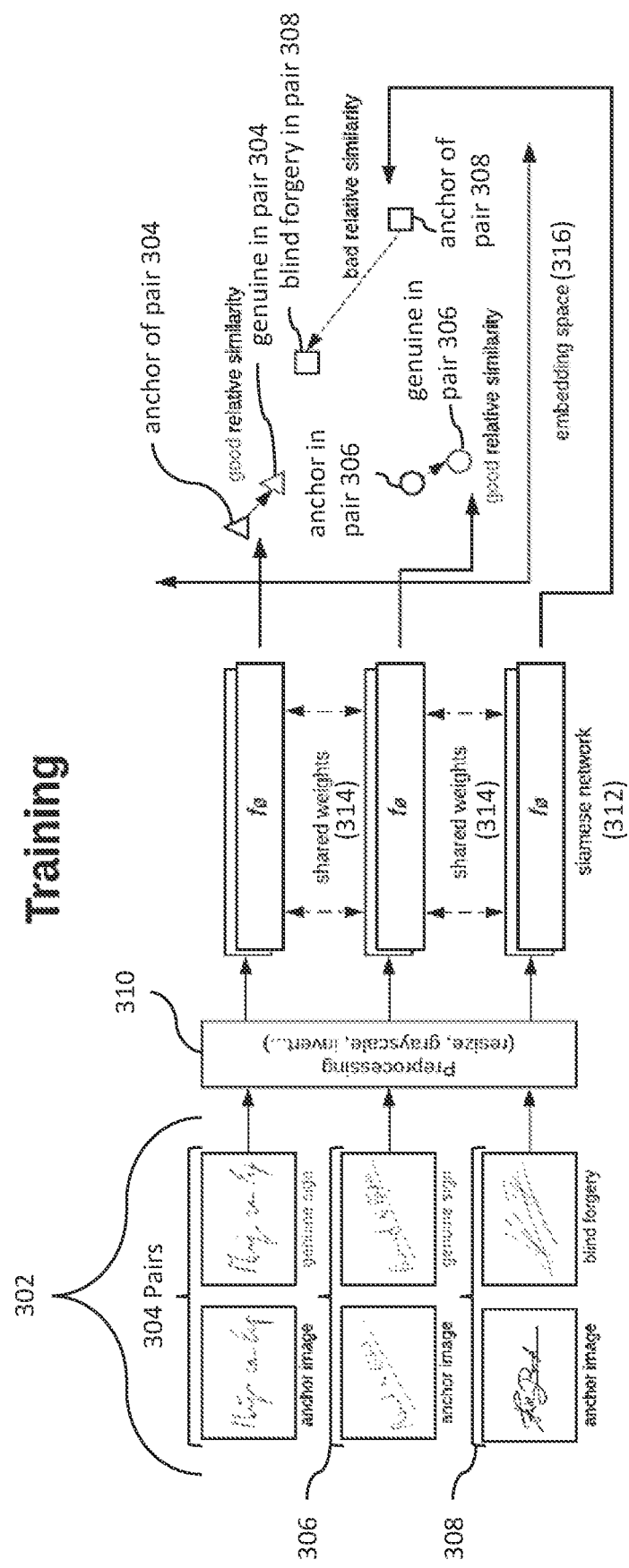
FIG. 3 comprises a diagram as configured in accordance with various embodiments of these teachings.

Referring now to FIG. 3, one example of training the models described herein is described. In this example, the training of the first model for detecting blind forgeries is described. In this approach, the dataset is contrived into appropriate formats for the blind forgery using Convolutional Neural Network (CNN) first model (CNN Model 1) with pairwise training.

For the training set of the first model, all possible pairwise combinations of either two genuine signatures of the same person (and labeled as genuine), or of two signatures of different people (akin to blind forgery; and label as forged) are created. In some aspects, all the images in the image pairs are resized and converted to arrays to be passed in the blind model.

For detecting blind forgeries, the training data is contrived and arranged in a way where each observation is a pair of images, either both of a person's genuine signature, or one of person's genuine signature, and the other of someone else's signature (can be true/forged). These will have labels (or class indicators) of "genuine" or "fraud" assigned to them.

The general approach is to determine whether two signature pairs appear to be of the same person or not. In some examples, once the training data is constructed in this format, the model is trained based upon convolutional Siamese network. Generally speaking, Siamese convolution networks are twin networks with shared weights, which can be trained to learn the feature embeddings where similar observations are placed in proximity and dissimilar are placed apart. This is achieved by exposing the network to a pair of similar and dissimilar observations and minimizing the dissimilarity between similar pairs while simultaneously maximizing it between dissimilar pairs as shown in FIG. 3.

FIG. 3 illustrates an embodiment of a first stage (as mentioned elsewhere herein) to detect blind forgery using Siamese Twin architecture. Images 302 include image pairs 304, 306, and 308. Each of the pairs includes an anchor (genuine) image and another image. The other one of the images in each pair may be either a genuine signature or a blind forgery.

The images pass through a pre-processing block 310 where re-sizing, re-formatting other functions can be performed. A Siamese convolution network 312 includes shared weights 314 and this network is trained with the image pairs 304, 306, and 308. An embedding space 316 is a representation of distances (similarities) between the anchor image and other image in the image pairs 304, 306, and 308. Each of the distances is classified as good (the other signature is classified as authentic) or bad (the other signature is classified as a forgery).

Figure 4:
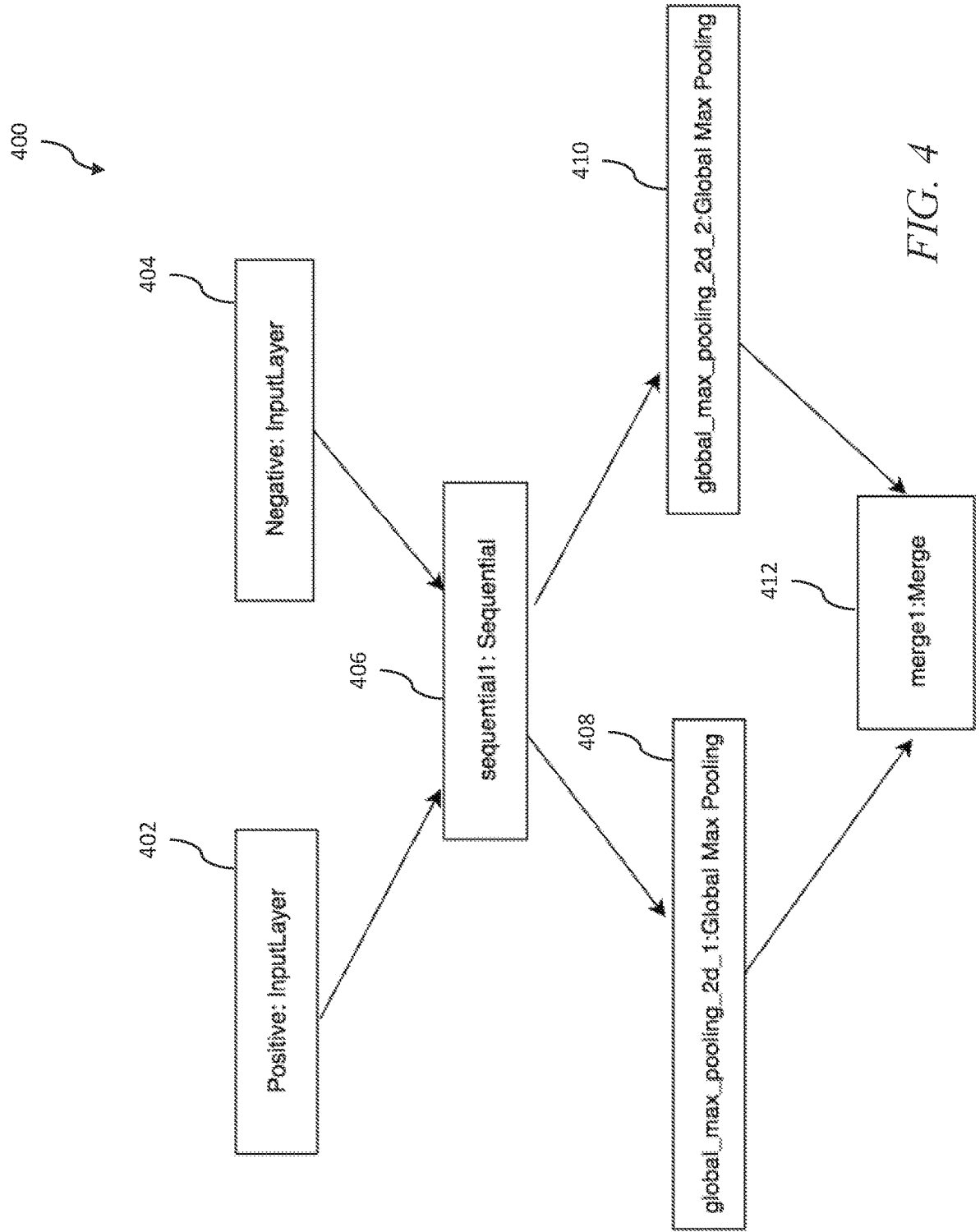
FIG. 4 comprises a diagram as configured in accordance with various embodiments of these teachings.

FIG. 4 illustrates some embodiments of an architecture of a CNN model 400 (CNN Model 1) for blind forgery detection. In some aspects, the CNN model 400 is constructed by passing pairwise images are passed through the CNN model 400 along with their labels (genuine or forged), and a Generalized linear model with logistic loss function is used for backpropagation to obtain the final image encodings from the network. A comparison to the desired output can then be made.

In aspects, the architecture of FIG. 4 defines a neural network 400 and included layers of this network. Generally speaking, information passes through the network 400. The network 400 includes a positive input layer 402, a negative input layer 404. Positive Input layer 402 is where a positive image of an authentic signature is input. Negative input layer 404 is where a negative image or a forged signature is input.

The network 400 also includes a sequential layer 406, which is a convolution layer and is used to extract information from the signature images that distinguishes shapes or other features in the signatures. Pooling layers 408 and 410 are used to reduce the number of parameters and computation in the network, and control overfitting by progressively reducing the spatial size of the network. There are two global max pooling layers 408 and 410 since one of these layers is for the positive (genuine) inputs and the other one is for negative (forged) inputs.

A max-pooling function in the pooling layers 408 and 410 will take out only the maximum from a pool. This is done with the use of filters sliding through the input; at every stride, the maximum parameter is taken out and the rest are dropped. This action down-samples the network 400. The input of pooling layers 408 and 410 are tensors (matrices with another dimension) and the output from the layers 408 and 410 are tensors with a reduced number of features but the same depth as the input.

If there are different inputs coming together after sets of operations and transformations (in this case, convolution and pooling) and they are to be combined, then concatenation is performed by a merge layer 412. After merging is complete, there will be one node only where the loss function will be computed and compared with the desired output.

A generalized linear logistic loss function is now described. In this example:
  a and b are the two signature images of different individuals (blind forged).

$x_a$, $x_b$ be the image embeddings of corresponding images each of dimension m.

$f'(x_a, x_b)$ represents the entire set of difference based features computed from the embeddings in space $R^m$. $f'$ will represent the final feature set for the generalized linear logistic loss function where the response will be the images are same (0) or blind forged (1)(y).

The Loss Function is defined as: $g(sigmoid(\Sigma(w*f'+b)),y)$ where g( ) is the Logistic Loss Function and y is the response.

Since logistic function is used as the softmax layer (sigmoid) in this CNN model, this architecture will predict the class at the end, i.e., after the training process in this model is completed, it will suffice to pass an image pair through this CNN model and get the prediction class of either genuine or fraud.

Figure 5:
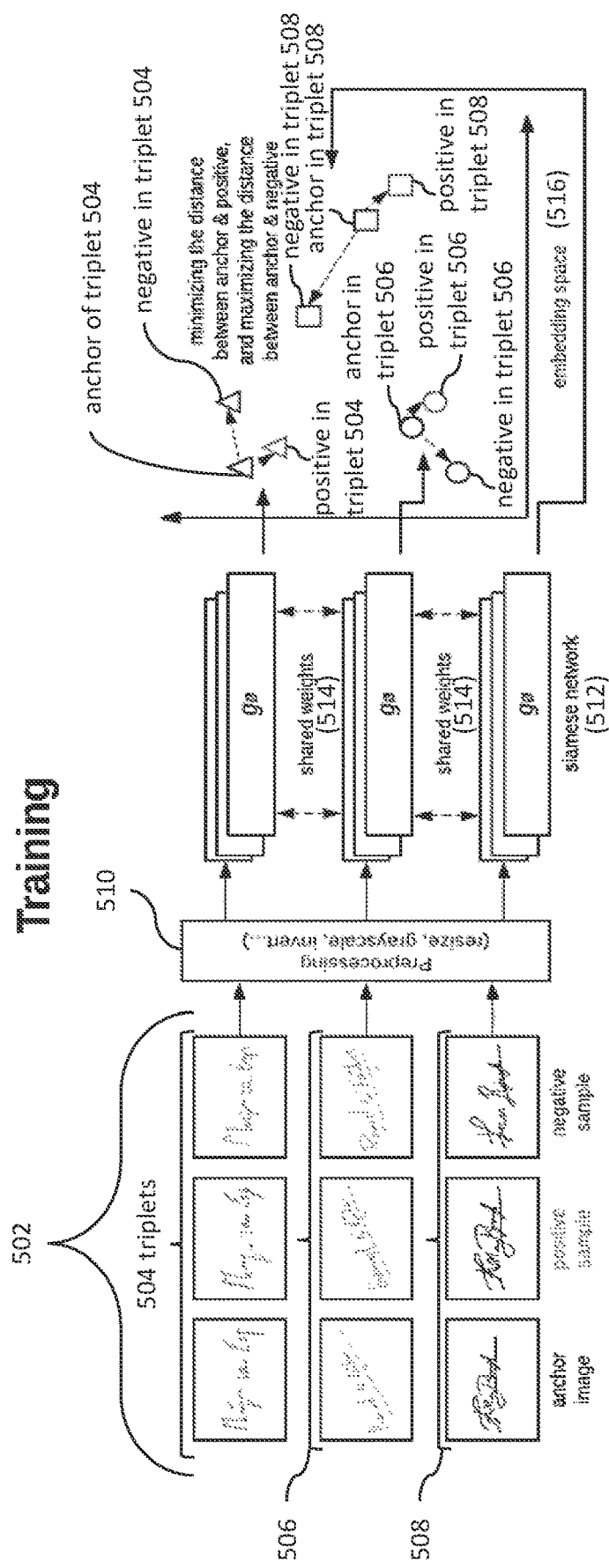
FIG. 5 comprises a diagram as configured in accordance with various embodiments of these teachings.

Referring now to FIG. 5, another example of training the models described herein is described. In this example, the training of the second model for detecting skilled forgeries is described. In this approach, the dataset is contrived into appropriate formats for the skilled forgery CNN second model using triplet loss training.

For the training set of the second model, all possible combinations of triplets from the data are created. This is done by taking an anchor image (genuine signature of a person) and placing it in conjunction with both a positive sample (another genuine signature of the same person) and a negative sample (a forged signature by someone else of the same person). In some aspects, all the images in image triplets are re-sized and converted to arrays to be passed in the skilled model.

In aspects, a more sophisticated model to detect fraud when the signatures look very identical (skilled forgeries) is constructed. Here the differences between the images of genuine and forged signatures are very minute and is challenging to detect by even a trained eye.

Generally speaking, a Siamese convolution neural network is used to train the model here as well, but using image triplets instead of image pairs. This is done by taking an anchor image (genuine signature of a person) and comparing it with both a positive sample (another genuine signature of the same person) and a negative sample (a forged signature by someone else of the same person). The image embeddings are created in such a way that the dissimilarity between the anchor image and positive image must be low and the dissimilarity between the anchor image and the negative image must be high for every triplet. This kind of architecture ensures that even small differences in signatures can be captured in order to flag or identify a skilled forgery as shown in FIG. 5.

FIG. 5 illustrates an embodiment of a second stage (as mentioned elsewhere herein) to detect skilled forgery using Triplet Ranking CNN Network. In some embodiments, this is done by constructing a second CNN model (CNN Model 2), where the triplets of images pass through the model and a standard triplet loss function (described elsewhere herein) is used along with the Adam Optimizer with mean absolute error for back propagation to obtain the final encodings that can be utilized during the testing process.

Images 502 include image triplets 504, 506, and 508. Each of the triplets includes an anchor (genuine) image, a positive (genuine) image and a negative (forged) image.

The images pass through pre-processing 510 where re-sizing, re-formatting other functions can be performed. A Siamese convolution network 512 includes shared weights 514 and this network is trained with the image triplets 504, 506, and 508. An embedding space 516 is a representation of distances (similarities) between the anchor image and other image in the image triplets 504, 506, and 508. Each of the distances is classified as good (the other signature is classified as authentic) or bad (the other signature is classified as a forgery).

Figure 6:
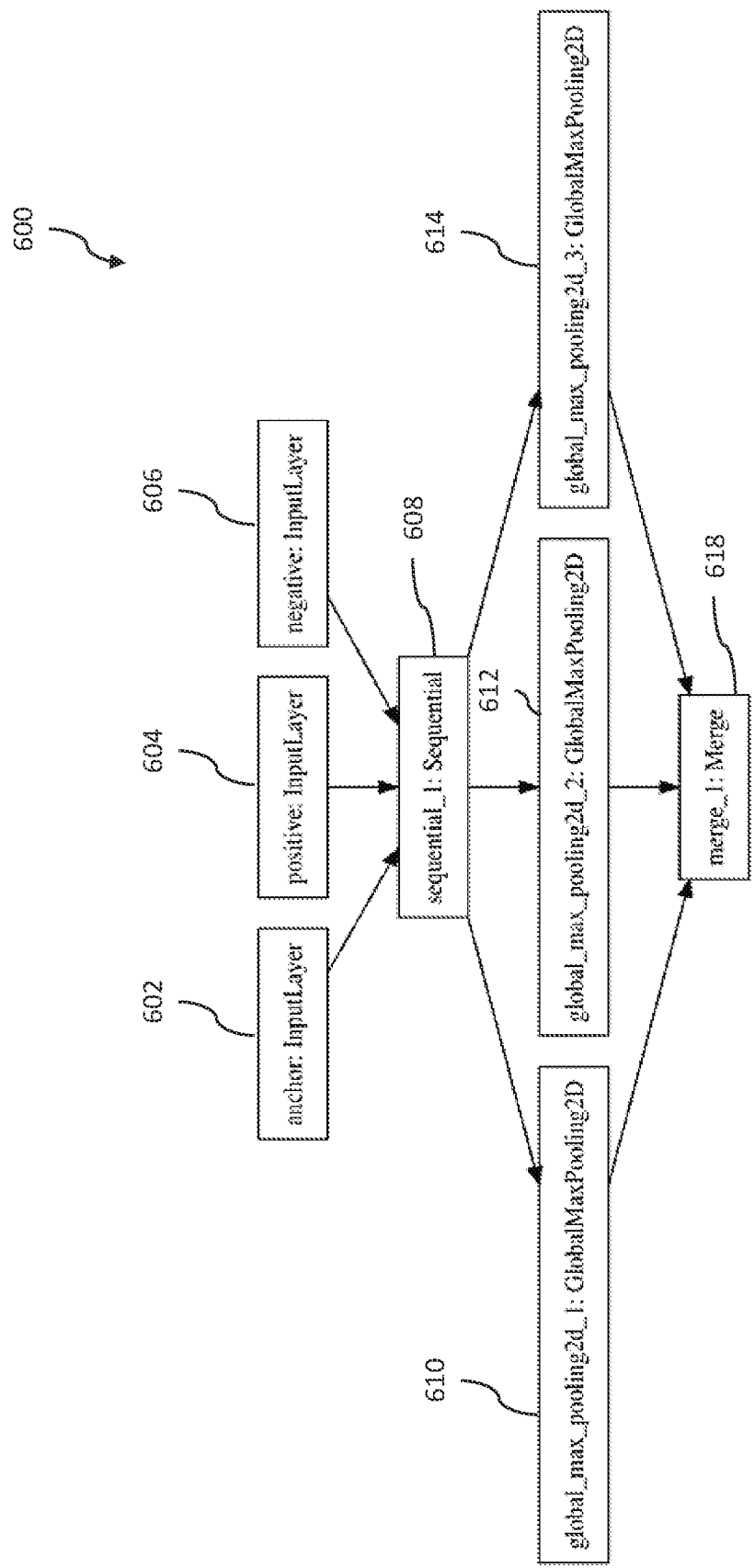
FIG. 6 comprises a diagram as configured in accordance with various embodiments of these teachings.

FIG. 6 illustrates an embodiment of an architecture of the CNN Model 2 for Skilled Forgery Detection. In aspects, the architecture of FIG. 6 defines a neural network 600 and layers of this network. Generally speaking, information passes through the network 600. The network 600 includes an anchor input layer 602, a positive input layer 604, and a negative input layer 606. Anchor input layer 602 is where a known authentic image of a signature is input. Positive Input layer 604 is where a positive image of an authentic signature is input. Negative input layer 606 is where a negative image or a forged signature is input.

The network 600 also includes a sequential layer 608, which is a convolution layer and is used to extract information from the signature images that distinguishes shapes or other features.

Pooling layers 610, 612, and 614 are used to reduce the number of parameters and computation in the network, and control overfitting by progressively reducing the spatial size of the network. There are three global max pooling layers 610, 612, and 614 since one is for the positive inputs and the other one is for negative inputs.

A max-pooling function in the pooling layers 610, 612, and 614 will take out only the maximum from a pool. This is done with the use of filters sliding through the input; at every stride, the maximum parameter is taken out and the rest are dropped. This action down-samples the network 600. The input of pooling layers 610, 612, and 614 are tensors (matrices with another dimension) and the output from the layers 610, 612, and 614 are tensors with a reduced number of features but the same depth as the input.

If there are different inputs coming together after sets of operations and transformations (in this case, convolution and pooling) and they are to be combined, concatenation is performed by a merge layer 616. After merging is complete, there will be one node only where the loss function will be computed and compared with the desired output.

In one example, a triplet loss function is:

$$\text{Loss} = \sum_{i=1}^{N} [\|f_i^a - f_i^p\|_2^2 - \|f_i^a - f_i^n\|_2^2 + \alpha]$$

where,
f(a) refers to the image encoding of the anchor a.
f(p) refers to the image encoding of the positive p.
f(n) refers to the image encoding of the negative n.
alpha is a constant used to make sure that the network does not try to optimize towards f(a)−f(p)=f(a)−f(n)=0.

Figure 7:
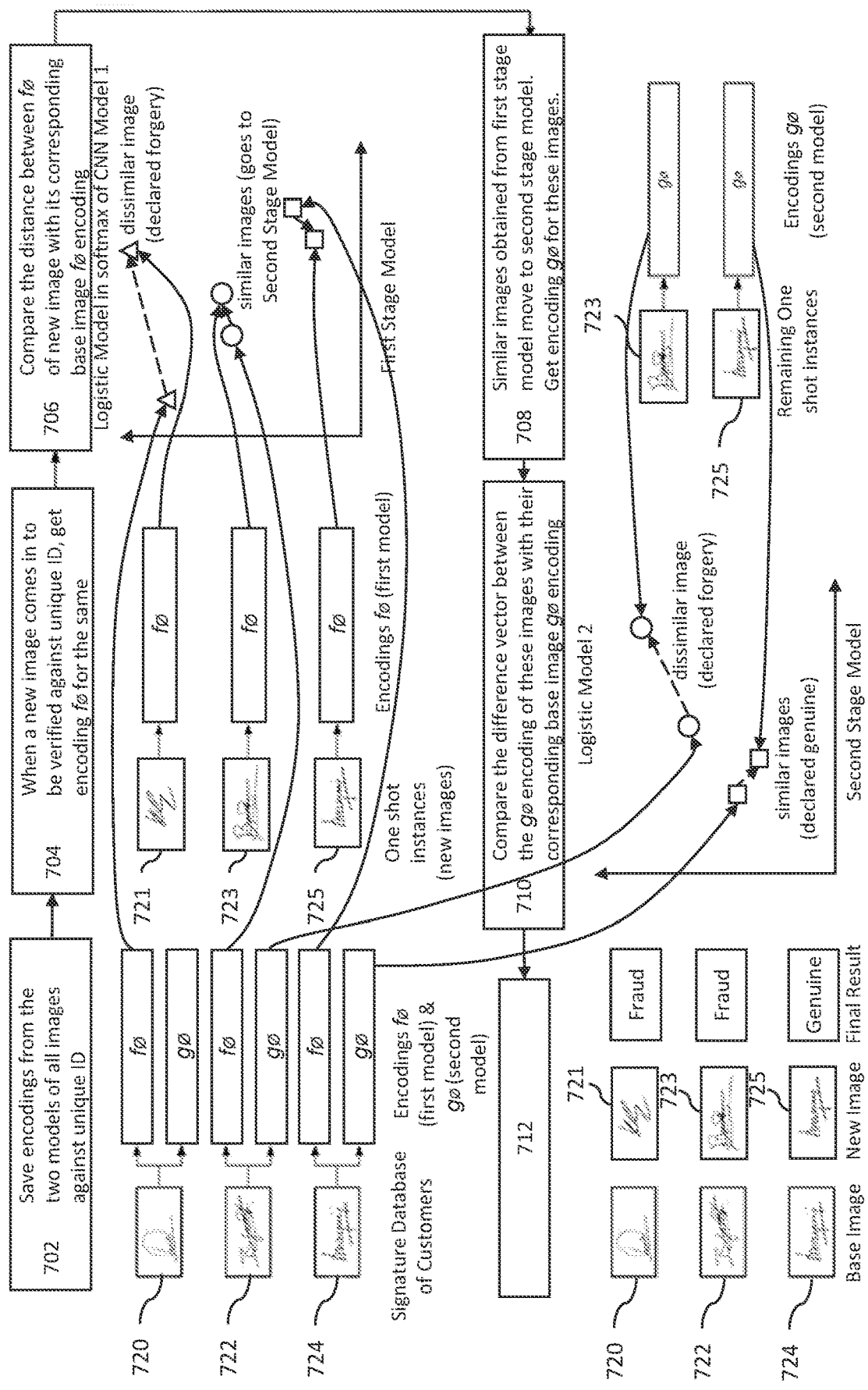
FIG. 7 comprises a diagram as configured in accordance with various embodiments of these teachings.

Referring now to FIG. 7, one example of testing signature images and whether the signatures are genuine or a forgery is described. In this example, there are six unique signature images 720, 721, 722, 723, 724, and 725. Images 720, 722, and 724 are genuine and images 721, 723, and 725 are test images, which are either genuine or forged.

At step 702, encodings of the genuine images (720, 722, 724) from the two models (one encoding for blind forgeries and one encoding for skilled forgeries) are linked to (associated with) a unique identifier (ID).

At step 704, when a new (test) image (721, 723, 725) comes in to be verified, against a unique identifier, the encoding for the image associated with the identifier is obtained from the first model.

At step 706, the distances between the encodings of the test image is compared with the corresponding base image encoding. When the distance is above a predetermined first threshold, the image is declared to be a forgery (i.e., a blind forgery). More specifically, for each signature, the difference vector passes through the pre-trained Logistic Model in softmax of CNN Model 1, which either declares the signature as genuine or forged based on how similar they are to the base signature. If the images are similar (in this case images 723 and 725), then execution moves to step 708.

At step 708, the similar images of signatures 723 and 725 obtained from the first model move to the second model. An encoding for each of these images is obtained from the second model.

At step 710, the distances between the encoding of these images with their encodings obtained from the second model are determined. For each signature, if the difference is above a predetermined second threshold, then the signature is declared to be a forgery (i.e., a skilled forgery). If not, the signature is declared to be authentic.

At step 712, the final result is obtained. Two of the test signatures 721 and 723 are declared forgeries, and one signature 725 is declared genuine.

Figure 8:
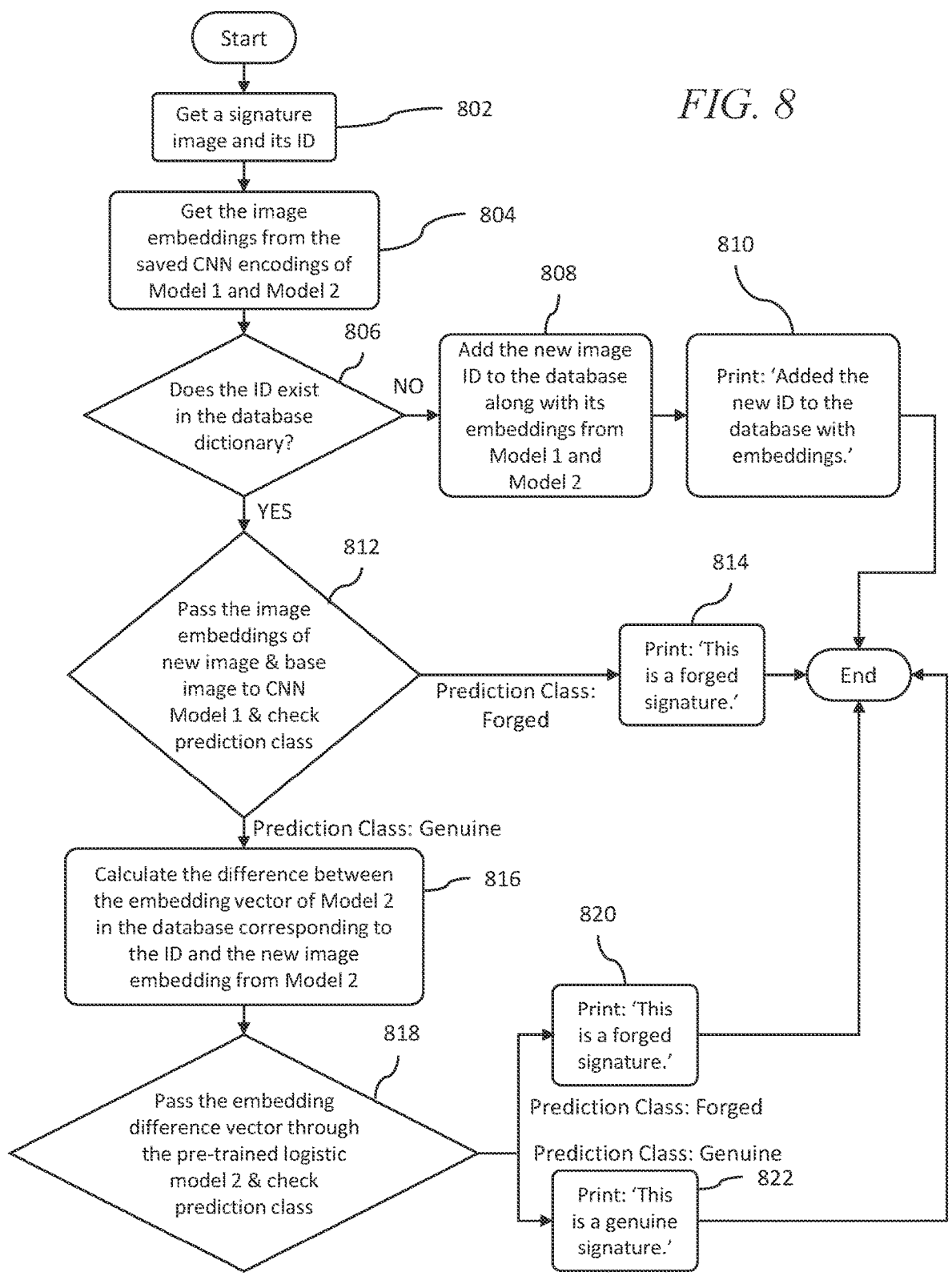
FIG. 8 comprises a flowchart as configured in accordance with various embodiments of these teachings.

Referring now to FIG. 8, one example of an overall process for testing whether signatures are genuine is described.

At step 802, a signature image and its identifier (ID) are obtained. The identifier may be any type of identifier.

At step 804, the image embeddings from the saved CNN encodings of the first model and the second model are obtained.

At step 806, it is determined whether the ID exists in a database dictionary. If the answer is negative, then and step 808, the new image ID is added to the database along with its embeddings from the first model and the second model. A message may be sent to a user indicating the new ID was added to the database with embeddings.

If the answer at step 806 is affirmative, execution continues with step 812. At step 812, the image embedding of the new image and the base image are passed through the first model and a prediction class is determined or checked. If the prediction class is "forged," then at step 814 a message may be sent to a user indicating that this is a forged image. Other actions as described elsewhere herein can also be taken. If the image prediction class is genuine, then execution continues with step 816.

At step 816, the difference between the embedding vector of the second model in the database corresponding to the ID and the embedding for the new image are calculated (e.g., as an embedding difference vector) according to the second model. At step 818, the embedding difference vector is passed through the pre-trained logistic model and the prediction class is determined or checked. If the prediction class is "forged," then at step 820 a message may be sent to a user indicating that this is a forged signature. If the image prediction class is genuine, then execution continues with step 822. At step 822, "this is a genuine signature" may be output (printed or otherwise presented in any electronic or non-electronic form) to a user.

In some embodiments, one or more of the exemplary embodiments include one or more localized IoT devices and controllers (e.g., included with or associated with the various sensors, cameras, or robots described herein). In another aspect, the sensors, cameras, or robots may be seen as an IoT device. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KM may be discarded depending upon the degree to which such KM has any value based on local processing and evaluation of such KM. In an exemplary embodiment, KRI may not even be utilized in any form if it is determined that KM is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data. In a further exemplary embodiment, the kernel will filter out noisy data ("KRN"). In an exemplary embodiment, KRN, like KM, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for detecting forged information in a retail environment, the system comprising:
    a trained first mathematical model that is configured to detect blind forgeries and a trained second mathematical model that is configured to detect skilled signature forgeries;
    a control circuit, the control circuit being configured to:
    receive an image from an image capture device, the image including a signature that is associated with a transaction concerning a retail environment;
    apply the image to the trained first mathematical model, and when the application determines the signature in the image is a blind signature forgery, perform a first action;
    when the application does not detect a blind forgery, apply the image to the trained second mathematical model to determine whether the signature in the image is a skilled forgery;
    when the signature in the image is determined to be a skilled forgery, perform a second action;
    when the signature in the image is determined not to be a skilled forgery, perform a third action.

2. The system of claim 1, wherein the first action, the second action, and the third action include one or more of: halting a retail transaction, finalizing or validating a retail transaction, issuing an electronic alert, issuing an electronic inquiry, accepting merchandise from a supplier at a loading dock, or releasing merchandise to a customer using an automated vehicle or robot.

3. The system of claim 2, wherein the electronic alert is sent to an employee of a retail store.

4. The system of claim 1, wherein the first mathematical model is trained at least in part by determining a dissimilarity score between pairs of images.

5. The system of claim 1, wherein Bayesian optimization is utilized to optimize parameters of the trained first mathematical model and the trained second mathematical model.

6. The system of claim 1, wherein the trained first mathematical model and the trained second mathematical model are convolutional neural networks.

7. The system of claim 1, wherein the control circuit comprises a first control circuit and a second control circuit, the first control circuit being disposed at a central location remote from a retail store, the second control circuit being associated with a mobile electronic device running a software application and being disposed at the retail store.

8. The system of claim 1, wherein the signature is associated with retail customers or business suppliers.

9. The system of claim 1, wherein the signature is disposed on a paper document or is an electronic signature.

10. A method for detecting forged information in a retail environment, the system comprising:
    providing a trained first mathematical model that is configured to detect blind forgeries and a trained second mathematical model that is configured to detect skilled signature forgeries;
    at a control circuit, receiving an image from an image capture device, the image including a signature that is associated with a transaction concerning a retail environment;
    at the control circuit, applying the image to the trained first mathematical model, and when the application determines the signature in the image is a blind signature forgery, performing a first action;
    at the control circuit and when the application does not detect a blind forgery, applying the image to the trained second mathematical model to determine whether the signature in the image is a skilled forgery;
    by the control circuit, when the signature in the image is determined to be a skilled forgery, performing a second action;
    by the control circuit, when the signature in the image is determined not to be a skilled forgery, performing a third action.

11. The method of claim 10, wherein the first action, the second action, and the third action include one or more of: halting a retail transaction, finalizing or validating a retail transaction, issuing an electronic alert, issuing an electronic inquiry, accepting merchandise from a supplier at a loading dock, or releasing merchandise to a customer using an automated vehicle or robot.

12. The method of claim 11, wherein the electronic alert is sent to an employee of a retail store.

13. The method of claim 10, wherein the first mathematical model is trained at least in part by determining a dissimilarity score between pairs of images.

14. The method of claim 10, wherein Bayesian optimization is utilized to optimize parameters of the trained first mathematical model and the trained second mathematical model.

15. The method of claim 10, wherein the trained first mathematical model and the trained second mathematical model are convolutional neural networks.

16. The method of claim 10, wherein the control circuit comprises a first control circuit and a second control circuit, the first control circuit being disposed at a central location remote from a retail store, the second control circuit being associated with a mobile electronic device running a software application and being disposed at the retail store.

17. The method of claim 10, wherein the signature is associated with retail customers or business suppliers.

18. The method of claim 10, wherein the signature is disposed on a paper document or is an electronic signature.

* * * * *